Patented Aug. 11, 1931

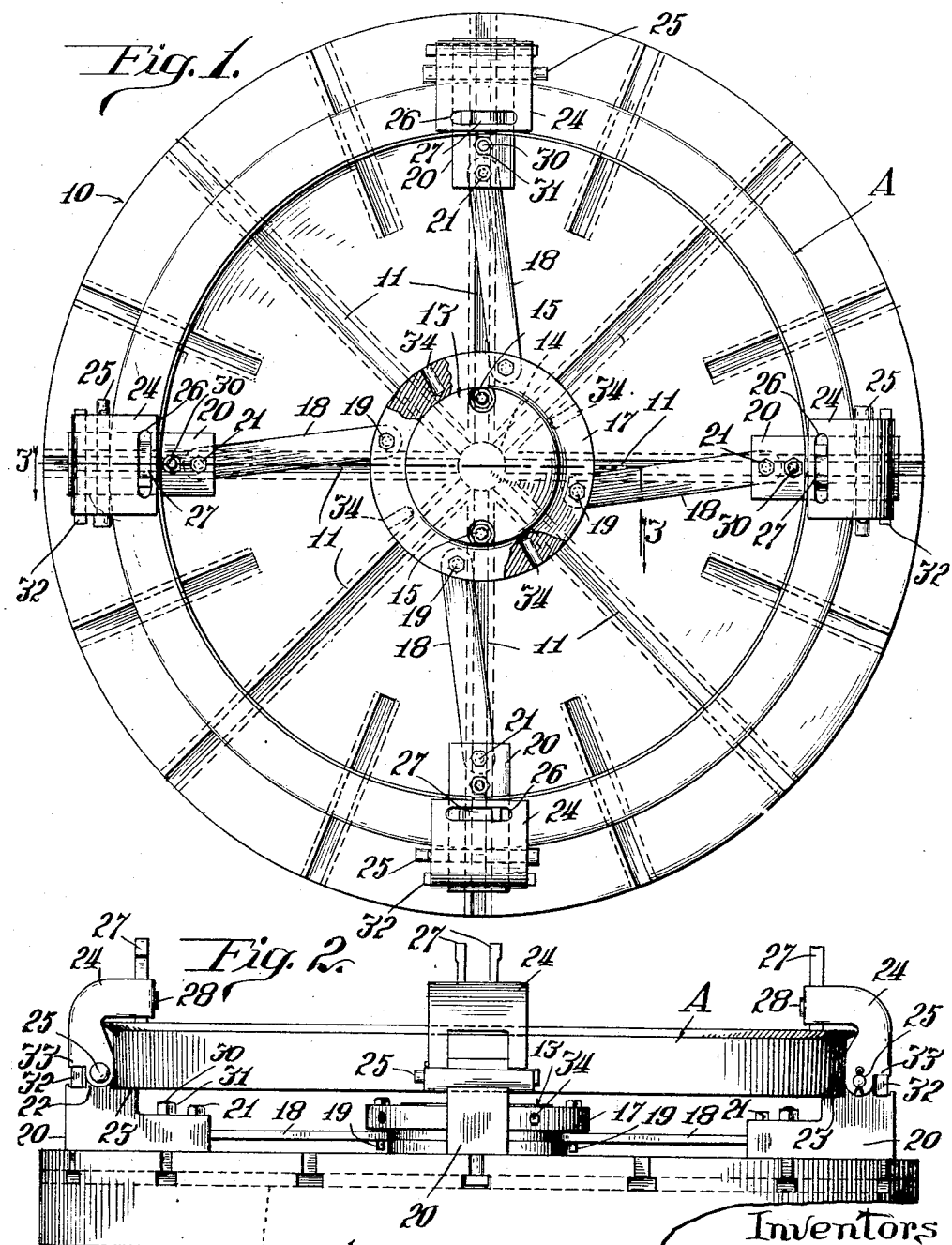

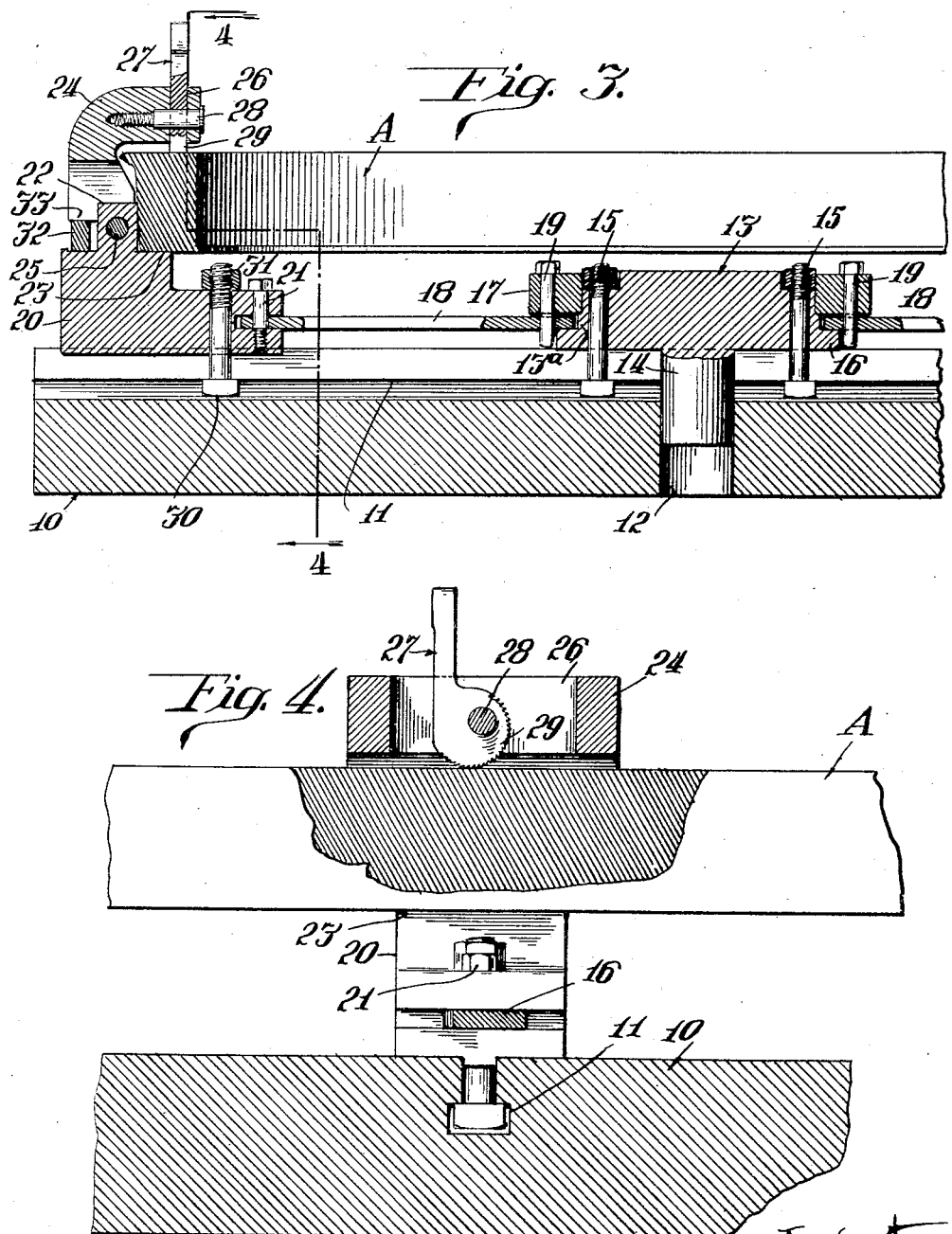

1,818,167

UNITED STATES PATENT OFFICE

EDWARD SEARS AND CARL F. WAGNER, OF DEER LODGE, MONTANA

CHUCK FOR MACHINE TOOLS

Application filed January 20, 1930. Serial No. 421,917.

Our invention relates to automatic chucks more particularly intended for use on boring mills adapted for cutting tires and wheels and boring wheel centers of cars and locomotives, or the machining of other annular work.

The invention has for its object the provision of means whereby varying sized tires and wheels may be operated on and whereby the tire or wheel clamping means will automatically tighten or form greater gripping relation with the tires or wheels as the cutting operation is started, with the result that the tire or wheel is firmly held against slipping or movement and truer operations made possible and heavier cuts to be taken.

Another object of the invention is to provide means which permit a more rapid chucking and unchucking of tires or wheels to be made and hence a greater number of tires or wheels to be operated on in a given period of time than has heretofore been possible.

The objects and advantages of our invention will all be readily comprehended from the following detailed description of the accompanying drawings, wherein:

Figure 1 is a plan view of our improved chuck with a wheel or tire in clamped position thereon.

Figure 2 is a side elevation thereof, with a portion of the table broken away, and a tire or wheel shown in position.

Figure 3 is a sectional view taken substantially along the line 3—3 of Figure 1.

Figure 4 is a sectional detail view taken on the line 4—4 of Figure 3 as viewed by the arrows.

Our invention relates to a chuck for use in connection with a boring mill whereby a car or locomotive tire or wheel may be quickly clamped in position on a suitable table indicated at 10.

This table 10 is preferably circular in form and provided with radially disposed slots or grooves shown at 11, running inwardly from the outer perimeter of the table 10 and terminating in the central opening or hole 12.

Mounted on the table 10 is a hub member 13 provided with a depending portion 14 adapted to fit snugly in the opening 12 of the table 10, as shown in Figure 3. The member 13 is held in place by the bolts 15 whose heads are arranged in the slots 11. The hub member 13 on its perimeter is provided with an annular shoulder 13$^a$ and therebeneath with an annular radial flange 16. Disposed about hub member 13 and resting on the shoulder 13$^a$ is an annular member or ring 17, arranged to permit rotation about member 13. With the annular member 17 seated on the shoulder 13$^a$ maintains the member 17 in spaced relation with the flange 16 and thus provides an annular groove, as shown, for the purpose of receiving the inner ends of the chuck-controlling arms or bars 18.

These arms or bars 18 are pivotally held to member 17 by suitable bolts or pins 19.

The outer ends of the bars or arms 18 are connected to the base portions 20 of the chuck elements which have their inner ends slotted to receive the adjacent ends of the arms or bars 18; said ends being pivotally held in place by suitable bolts or pins 21 which extend downwardly through the inner slotted ends of the base portions 20 of the chuck elements, as shown in Figure 3. The base portions 20 are provided with upstanding lugs or portions 22 arranged at an intermediate point relative to the other side edges of the base member so as to leave a shoulder 23 on which the wheel or tire A rests.

Pivotally secured to each upstanding lug 22, so as to swing vertically, is a chuck head or jaw 24 whose lower end is preferably bifurcated to straddle the stud or lug 22.

The bifurcations and the lug have registering apertures to receive a suitable pivot pin 25 so as to pivotally connect the chuck elements 24 in place and permit them to swing vertically toward and away from the tire A; it being understood that the chuck heads or jaws 24 have their upper ends disposed horizontally in hook form so as to extend over the top of the tire, as shown in Figures 2 and 3.

The chuck heads or jaws 24 each have a slot 26 extending vertically therethrough for the purpose of receiving the eccentrically mounted clamp elements 27 which are eccentrically pivoted to the jaws 24 by means of suitable tap bolts or pins 28 whereby rotative movement of the clamp elements is permitted. The clamp elements 27 have the elongated finger-engaging ends, while the lower pivoted end is preferably provided with a serrated surface, as at 29, adapted to provide greater gripping relation with the top surface of the tire A. It is apparent from the construction shown in Figure 4, where the clamp element 27 is shown in clamping position, that by swinging the free end of the clamp member toward the right in Figure 4 will release the clamp and move its eccentric serrated head out of engagement with the tire or wheel.

When it is desired to perform a cutting operation on the metal tire A, the latter is placed on the shoulders 23 of each of the base portions 20 of the chuck elements; it being understood that the jaws 24 of each of the chuck elements have previously been swung outwardly about the pivot points or pins 25 and therefore away from the tire.

The chuck elements are drawn into firm or intimate relation with the tread of the tire by imparting slight rotative movement to the annular element 17, thereby drawing inwardly on the various arms 18 which latter are, of course, of equal length. Such rotative movement of the element 17 will draw the arms 18 into the position shown in Figure 1, which causes the chuck elements to be drawn inwardly on the table. The positions of the chuck elements, relative to the table, are maintained by bolts 30 whose heads ride in the slots or grooves 11 of the table and thus maintain the chuck elements in regular alignment with the axis of the hub member 13. After the chuck elements have been thus brought into intimate relation with the tread of the wheel or tire, the chuck elements are then firmly held in position by screwing up the nuts 31 on the bolts 30, thus maintaining the adjusted position of the elements. After this has been done, the jaw members 24 are then swung upwardly over the wheel or tire in the positions shown in the figures, at which time a suitable wedge member 32 is then preferably driven transversely beneath the shoulder 33 formed adjacent to the pivotal end of each jaw.

This firmly maintains the jaws of the clutch elements in clamping position. The eccentrically mounted dogs or clamp elements 27 are then rotated about their pivot pins 28 in the manner shown in Figure 4 so as to bring the eccentric portion of the serrated head 29 into firm gripping relation with the top surface of the wheel or tire A. With the dogs or clamp elements 27 in this position, the latter will automatically increase their gripping relation with the tire as the cutting operation on the tire is started.

In order to permit the necessary rotative movement of annular member 17 to be performed, the latter, on its outer perimeter at a number of spaced apart places, is preferably provided with the radially disposed sockets or holes 34 for the purpose of receiving a suitable tool or implement to provide leverage for rotating the element 17, to an extent sufficient to cause arms 18 to draw the chuck elements with their upstanding lugs 22 into firm relation with the perimeter of the wheel or tire to be operated on.

The drawings disclose what we believe to be a simple embodiment of the invention which has been described in terms employed merely as terms of description and not as terms of limitation, as structural modifications are possible and may be made without, however, departing from the spirit of our invention.

What we claim is:

1. A device for holding a locomotive or car wheel tire comprising an annular table provided with a central opening and with radially disposed slots intermediate of said opening and the perimeter of the table; a member provided with a depending hub which is adapted to extend into the central opening of the table; means for holding said member against rotation; a second member rotatably disposed about the first member; chuck elements disposed at diametrically opposite points on said table and provided with tire receiving surfaces; hook-shaped jaw members pivotally secured at their lower ends on the chuck elements so as to swing vertically with the free ends provided with vertical openings; vertically disposed tire clamp elements eccentrically mounted on said openings in the jaw members so as to have increasing clamping action on the tires as the clamp elements are caused to move rotatably; radially disposed connecting bars pivotally secured at their respective ends to said second mentioned member and said chuck elements; and means disposed through the chuck elements and engaging in the radial slots of the table whereby the chuck elements may be locked in adjusted position.

2. A device of the character described comprising an annular table provided with a central hole and with radially disposed slots; a hub member provided with a central hub seated in said hole; a ring rotatably disposed about the hub member; chuck elements diametrically disposed on said table in alignment with the slots and each having a tire receiving upper surface and an upstanding lug adjacent to said surface; hook-shape jaw members each having a bifurcated lower end adapted to straddle said upstanding lug and to be pivotally secured thereto so as to swing vertically across the top of the wheel tire, the free ends of the jaw elements being transversely slotted; vertically disposed clamping elements eccentrically mounted in said jaw element slots and adapted to provide increasing clamping action on the upper surface of the tire; connecting bars pivotally connected at their respective ends to said ring and to each of said chuck elements; means engaging in the table slots, whereby the chuck elements are clamped in their adjusted positions; and wedge elements insertible on the chuck elements beneath the pivoted ends of the jaw members.

EDWARD SEARS.
CARL F. WAGNER.